US009020129B2

United States Patent
Busayapongchai

(10) Patent No.: US 9,020,129 B2
(45) Date of Patent: *Apr. 28, 2015

(54) METHODS, SYSTEMS, AND COMPUTER PROGRAM PRODUCTS FOR PROVIDING HUMAN-ASSISTED NATURAL LANGUAGE CALL ROUTING

(71) Applicant: AT&T Intellectual Property I, L.P., Atlanta, GA (US)

(72) Inventor: Senis Busayapongchai, Tucker, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/167,683

(22) Filed: Jan. 29, 2014

(65) Prior Publication Data

US 2014/0146962 A1 May 29, 2014

Related U.S. Application Data

(63) Continuation of application No. 13/545,382, filed on Jul. 10, 2012, now Pat. No. 8,666,055, which is a continuation of application No. 11/191,756, filed on Jul. 28, 2005, now Pat. No. 8,265,260.

(51) Int. Cl.
*H04M 3/00* (2006.01)
*H04M 5/00* (2006.01)
(Continued)

(52) U.S. Cl.
CPC ............. *H04M 3/5233* (2013.01); *H04M 3/51* (2013.01); *H04M 3/5166* (2013.01); *G10L 15/26* (2013.01);
(Continued)

(58) Field of Classification Search
CPC ... H04M 3/493; H04M 3/4933; H04M 3/523; H04M 3/5233; H04M 3/51; H04M 3/5166; H04M 3/5175; H04M 3/5183; H04M 3/5232; H04M 3/5237; H04M 3/5238; H04M 2201/40; H04M 2203/2061; H04M 2203/2011; H04M 2242/12; G10L 15/26; G06Q 10/06
USPC ............. 379/265.01, 265.02, 265.03, 265.04, 379/265.05, 265.06, 265.07, 265.08, 379/265.09, 265.1, 265.11, 265.12, 265.13, 379/265.14, 266.01, 26, 6.02, 266.03, 379/266.04, 266.05, 266.06, 266.07, 379/266.08, 266.09, 266.1
See application file for complete search history.

(56) References Cited

U.S. PATENT DOCUMENTS 5,592,542 A 1/1997 Honda et al.
6,061,347 A 5/2000 Hollatz et al.
(Continued)

OTHER PUBLICATIONS

Cheng, et al., "A Wizard of Oz Framework for Collecting Spoken Human-Computer Dialogs", Proceedings of the International Conference on Spoken Language Processing, 8, p. 2268-2272 (2004).
(Continued)

*Primary Examiner* — Khai N Nguyen
(74) *Attorney, Agent, or Firm* — Cantor Colburn LLP

(57) ABSTRACT

Techniques for routing a telephone call are provided. A call interface device of an interactive voice response system is configured to receive the telephone call from a caller. A level one agent processing module routes the telephone all to a level one agent for an agent interview of the caller when level three and level two agents are not available. A level two agent processing module handles the telephone call when the level three agent is not available. A level three agent processing module facilitates the handling of the telephone call when the level three agent is available.

20 Claims, 4 Drawing Sheets

(51) Int. Cl.
    *G10L 21/00*    (2013.01)
    *G10L 25/00*    (2013.01)
    *H04M 3/523*    (2006.01)
    *H04M 3/51*     (2006.01)
    *H04M 3/493*    (2006.01)
    *G10L 15/26*    (2006.01)

(52) U.S. Cl.
    CPC ............ *H04M 3/4933* (2013.01); *H04M 3/523* (2013.01); *H04M 2201/40* (2013.01); *H04M 2203/2011* (2013.01); *H04M 3/493* (2013.01)

(56) References Cited

U.S. PATENT DOCUMENTS

| | | | |
|---|---|---|---|
| 6,704,410 B1 | 3/2004 | McFarlane et al. | |
| 6,728,677 B1 * | 4/2004 | Kannan et al. | 704/270 |
| 7,606,714 B2 * | 10/2009 | Williams et al. | 704/275 |
| 8,265,260 B2 * | 9/2012 | Busayapongchai | 379/265.01 |
| 2003/0191648 A1 | 10/2003 | Knott et al. | |
| 2005/0049868 A1 * | 3/2005 | Busayapongchai | 704/251 |
| 2005/0105712 A1 * | 5/2005 | Williams et al. | 379/265.02 |
| 2005/0163304 A1 | 7/2005 | Judkins et al. | |
| 2005/0259575 A1 | 11/2005 | Krishnamurthi et al. | |
| 2005/0286707 A1 | 12/2005 | Erhart et al. | |
| 2006/0259294 A1 * | 11/2006 | Tashereau | 704/10 |
| 2014/0129220 A1 * | 5/2014 | Zhang et al. | 704/235 |

OTHER PUBLICATIONS

Stuttle "A Framework for Dialogue Data Collection with a Stimulated ASR Channel", Proceedings of the International Conference on Spoken Language Processing, 8, pp. 241-244 (2004).

* cited by examiner

METHODS, SYSTEMS, AND COMPUTER PROGRAM PRODUCTS FOR PROVIDING HUMAN-ASSISTED NATURAL LANGUAGE CALL ROUTING

CROSS REFERENCE TO RELATED APPLICATIONS

This application is a continuation application of U.S. application Ser. No. 13/545,382, filed on Jul. 10, 2012, (now U.S. Pat. No. 8,666,055), which is a continuation of U.S. application Ser. No. 11/191,756, filed on Jul. 28, 2005 (now U.S. Pat. No. 8,265,260), the disclosures of which are hereby incorporated by reference in their entirety.

BACKGROUND

Exemplary embodiments relate generally to call routing, and more particularly, to methods, systems and computer program products for providing multi-level natural language call routing.

Companies offering consumer products or services usually provide call center agents to assist consumers. After picking up the telephone, the agent asks the caller to describe the reason for the telephone call. If that agent cannot help the caller, the telephone call can then be transferred to another agent who is more qualified to help the caller. Because of high agent cost, companies would like to find a way to automate the agent tasks. Companies could reduce their cost per telephone call by utilizing an interactive voice response (IVR) system to respond to caller requests before transferring the telephone call to live agents.

Traditionally, consumers interact with an IVR system using the telephone keypad. The caller hears a few options, each having an associated key to press. Earlier services using speech recognition technology directly replaced touch-tone menus with speech menus. For example, a caller may hear: "for account balance, press one or say one." Later speech recognition services allowed callers to say one of highly constrained spoken commands. For instance, a caller may hear: "for account balance, say balance."More complex speech recognition services determine the caller's task by asking a series of questions, which is called a directed strategy.

There are several disadvantages of a menu system. If there are more than a few routing destinations, the menus will be arranged in hierarchical layers and it can take a relatively long time for the caller to get to the proper destination. A caller may misunderstand the options, and select a wrong key, which then causes the IVR to misdirect the telephone call.

SUMMARY

Exemplary embodiments relate to methods, systems, and computer program products for routing a telephone call. A system includes a call interface device on an IVR system for receiving a telephone call from a caller. The system also includes a level one agent processing module including instructions for routing the telephone call to a level one agent for an agent interview of the caller when a level three agent and a level two agent are not available to handle the telephone call, and when the telephone call is not directed by the interactive voice response system after an initial interaction between the caller and the interactive voice response system. The system further includes a level two agent processing module including instructions for handling the telephone call when the level three agent is not available, when the telephone call is not directed by the interactive voice response system after the initial interaction, and when the level two agent is available.

The level two agent processing module simultaneously initiates a second interaction between the caller and the interactive voice response system and determines availability of the level two agent. The level two agent processing module is configured to enable the level two agent to listen to the second interaction between the interactive voice response system and the caller, and the telephone call is routed to the level two agent for direct communication with the caller when the level two agent is unable to route the telephone call after listening to the second interaction. The system further includes a level three agent processing module including instructions for facilitating the handling of the telephone call when the level three agent is available. The handling of the telephone call includes enabling the level three agent to listen to the initial interaction, routing the telephone call to the level three agent in response to the initial interaction, and directly utilizing caller utterances of the telephone call to improve speech recognition accuracy of an automated recognizer of the interactive voice response system.

Computer-implemented methods for routing a telephone call are also provided. A method includes receiving the telephone call from a caller at a call interface device on an interactive voice response system. The method also includes processing the telephone call at a call routing module in the interactive voice response system. The processing includes performing level one agent processing when a level three agent and a level two agent are not available to handle the telephone call, and when the telephone call is not directed by the interactive voice response system after an initial interaction between the caller and the interactive voice response system. Performing the level one agent processing includes routing the telephone call to a level one agent for an agent interview of the caller.

The processing also includes performing level two agent processing when the level three agent is not available to handle the telephone call, when the telephone call is not directed by the interactive voice response system after the initial interaction, and when a level two agent is available. The level two agent processing module simultaneously initiates a second interaction between the caller and the interactive voice response system and determines availability of the level two agent. The level two agent processing module is configured to enable the level two agent to listen to the second interaction between the interactive voice response system and the caller, and the telephone call is routed to the level two agent for direct communication with the caller when the level two agent is unable to route the telephone call after listening to the second interaction. The processing also includes performing level three agent processing when a level three agent is available. The level three agent processing includes facilitating the handling of the telephone call, which includes enabling the level three agent to listen to the initial interaction, routing the telephone call to the level three agent in response to the initial interaction, and directly utilizing caller utterances of the telephone call to improve speech recognition accuracy of an automated recognizer of the interactive voice response system.

Computer program products for routing a telephone call are also provided.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Exemplary embodiments provide a new dialog strategy for a natural language call routing application. The term "natural language call routing" refers to a telephone routing service that allows callers to describe what they want, such as information or problems, in natural spoken language. Exemplary embodiments are designed to maximize the human agent availability to reduce misrecognition and re-prompt rate. This dialog strategy seamlessly utilizes human agents to assist the natural language understanding system in routing telephone calls, especially when the system has problems recognizing the utterances of the caller.

Exemplary embodiments provide a call center architecture for maximizing the availability of human agents. According to one embodiment, the human agents are categorized into three skill sets or skill levels. The agents in the first level will interact with the caller directly by asking the user to repeat a request. The telephone call will be routed after the caller and agent agree on the domain the caller refers to. Basically, the first level agents are the typical call center agents in use today.

The agents in the second and third skill levels interact indirectly with the caller through a setup similar to a Wizard of Oz (WOz) framework. In a typical WOz framework, the subject talks to what appears to be an automatic system, but the system's responses are in fact generated by a human (the "wizard") in the call center. The system will be set up so that the callers think that they are interacting with an IVR system. An agent in the second skill level will interact with the caller if the IVR system fails to recognize the caller utterance for whatever reasons. An agent in the third skill level will help the user from the beginning of the telephone call and allow the caller to bypass the automated recognizer portion of the IVR system. If the agent in these upper skill levels thinks that he/she needs to ask additional questions and/or get additional clarification from the caller, the agent can take over the telephone call and speak directly to the caller.

There are benefits for the agents in the third skill level to interact directly with the callers. First, the recorded caller's utterances may be directly utilized for training and improving the speech recognition accuracy of the automated recognizer and call routing software since callers think they are interacting with the IVR system. Second, callers typically talk less with the machine/system that with the human agent, so the agents will be free to help other callers faster.

Figure 1:
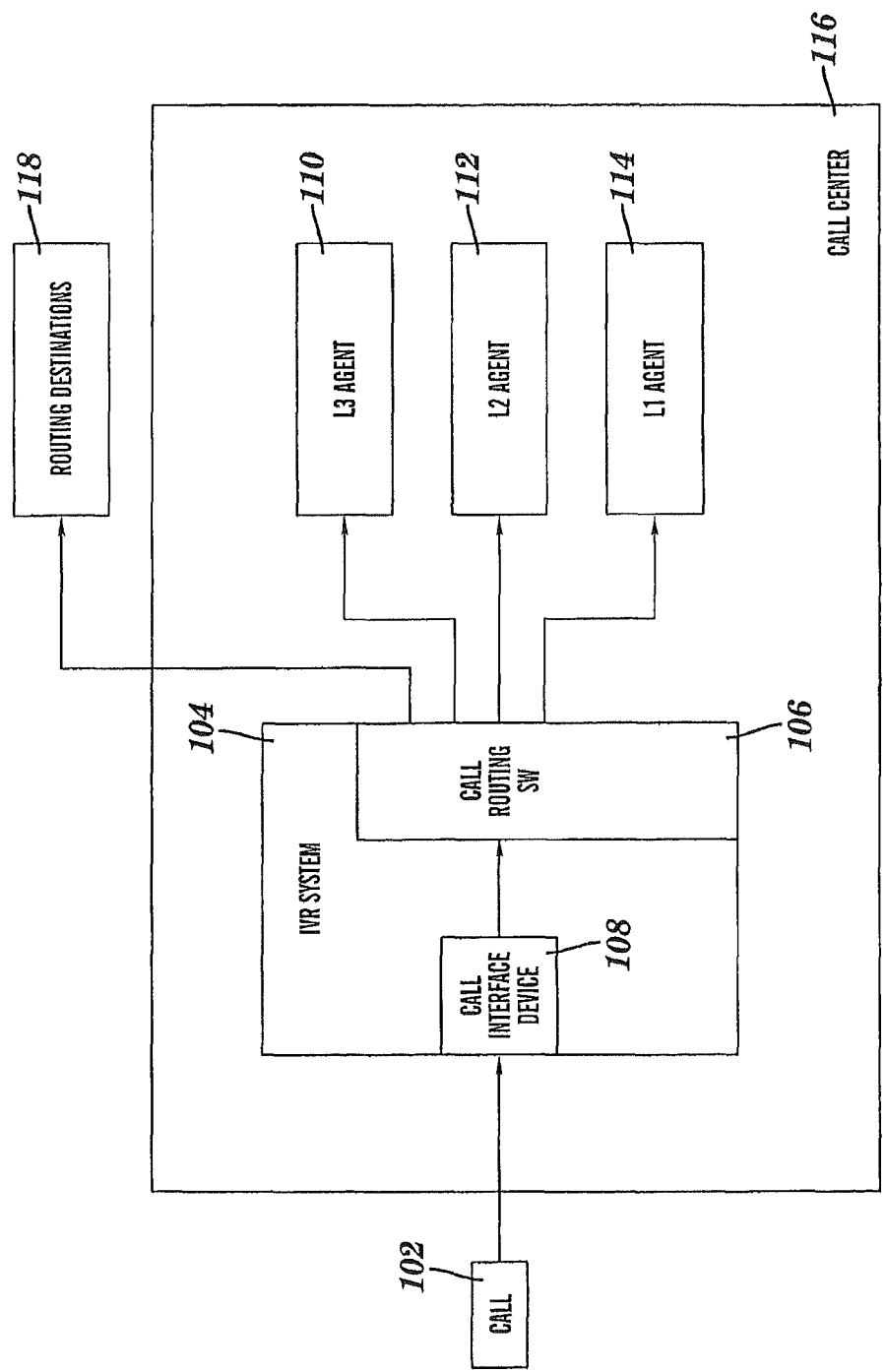
FIG. 1 is a block diagram of an exemplary system that may be utilized to provide human-assisted natural language call routing.

FIG. 1 is a block diagram of an exemplary system that may be utilized to provide human-assisted natural language call routing. The system in FIG. 1 includes an IVR system 104 for receiving a telephone call 102 from a caller. The IVR system 104 includes a call interface device 108 for receiving a telephone call, and call routing software 106 to route the telephone call 102 between the level three agent(s) 110, the level two agent(s) 112 and the level one agent(s) 114 and the routing destinations 118. When the telephone call 102 first comes in, the IVR system 104 interacts with the caller.

The telephone call 102 comes in to the IVR system 104 from a telephone network via a call interface device 108 such as a telephony card for a public switched telephone network (PSTN), and/or a network card for voice over Internet Protocol (VoIP). In exemplary embodiments, based on the dialed number identification service (DNIS) (i.e., the telephone number dialed by the caller), the call routing software 106 is activated to carry out the processing described below in reference to FIGS. 2 and 4. Other DNISs may be handled by the same IVR system 104 and cause the activation of other routing software (not shown) in the IVR system 104. If a level one agent 114 is selected, the call routing software 106 will perform a plain call transfer. If a level three agent 110 is selected, the application will perform a special case of a three way conference, but the caller will not hear what the agent says (WoZ setup). The transfer to the level two agent 112 is similar to the level three agent 110, but it happens only after the caller's utterance has not been recognized by the IVR system 104.

The IVR system 104 may be implemented by any commercially available system such as, but not limited to: the Nortel Media Processing Server from Nortel; the NexusPoint platform from VoiceGenie; the HMIHY (How May I Help You) system from AT&T; and the Call Director system from BBN. The level three agent(s) 110, level two agent(s) 112 and level one agent(s) 114 are referred to collectively herein as call center operators. The level three agent(s) 110 are assigned to a level three agent pool, the level two agent(s) 112 are assigned to a level two agent pool, and the level one agent(s) 114 are assigned to a level three agent pool. See FIG. 4 and the accompanying description for an exemplary embodiment of how the agents are assigned to the agent pools.

The system for routing telephone calls, the IVR system 104, depicted in FIG. 1 includes call routing software 106. The call routing software 106 includes three modules: a level one agent processing module, a level two agent processing module and a level three agent processing module. The level one agent processing module facilitates the handling of the telephone call 102 when it is not directed by the IVR system 104 after an initial and second interaction between the caller and the IVR system 104. In other words, after two attempts by the IVR system 104 to understand the utterances of the caller, the telephone call 102 is routed to a level one agent 114.

The level two agent processing module facilitates the handling of the telephone call 102 when it is not directed by the IVR system 104 after the initial interaction with the IVR system 104, and when a level two agent 112 is available (i.e., a level two agent 112 is idle in the level two agent pool). If a level two agent 112 is available, the level two agent 112 listens in on the second interaction between the IVR system 104 and the caller (and may also replay the initial interaction between the IVR system 104 and the caller) and routes the telephone call 102 (without the callers knowledge) based on what he or she hears.

The level three agent processing module in the call routing software 106 facilitates the handling of the telephone call 102 when a level three agent 110 is available/idle in the level three agent pool. If a level three agent 110 is available, the level three agent 110 listens in on the first interaction between the IVR system 104 and the caller and routes the telephone call 102 (without the callers knowledge) based on what he or she hears.

The level three agents 110, level two agents 112 and level one agents 114 utilize telephone devices such as Natural Language Speech Assistant (NLSA) from Unisys. In exemplary embodiments, the telephone devices include a combination of telephony set up and software. The telephony is set up so that the call 102 is transferred to an agent, but whatever the agent says will not be heard by the caller. The recognizer portion of the IVR system 104 will not listen to the caller at that time either. After the caller repeats the request, or the agent replays the recorded utterance, the agent will select a destination. The caller will then be transferred to that selected destination, or routing destination 118.

Functions performed by the telephone devices include listening to interactions between the IVR system 104 and the caller, communicating a routing destination 118 to the IVR system 104 and speaking directly to the caller. If an agent only has the skills to perform level one processing, the agent device would not need to include the ability to listen in to the initial and second interactions between the IVR system 104 and the caller.

Routing destinations 118 include any place where the telephone call 102 may be routed including, but not limited to: an agent in a particular department, an agent specialized in a particular subject, a recorded message, another IVR system 104, and/or another automated call handling system. Based on information from the IVR system 104, the level three agent 110, the level two agent 112, the level one agent 114 and instructions from the call routing software 106, the telephone call 102 is routed to a particular routing destination 118. The routing may be performed in any manner known in the art to transfer a telephone call 102 from one destination to another.

Figure 2:
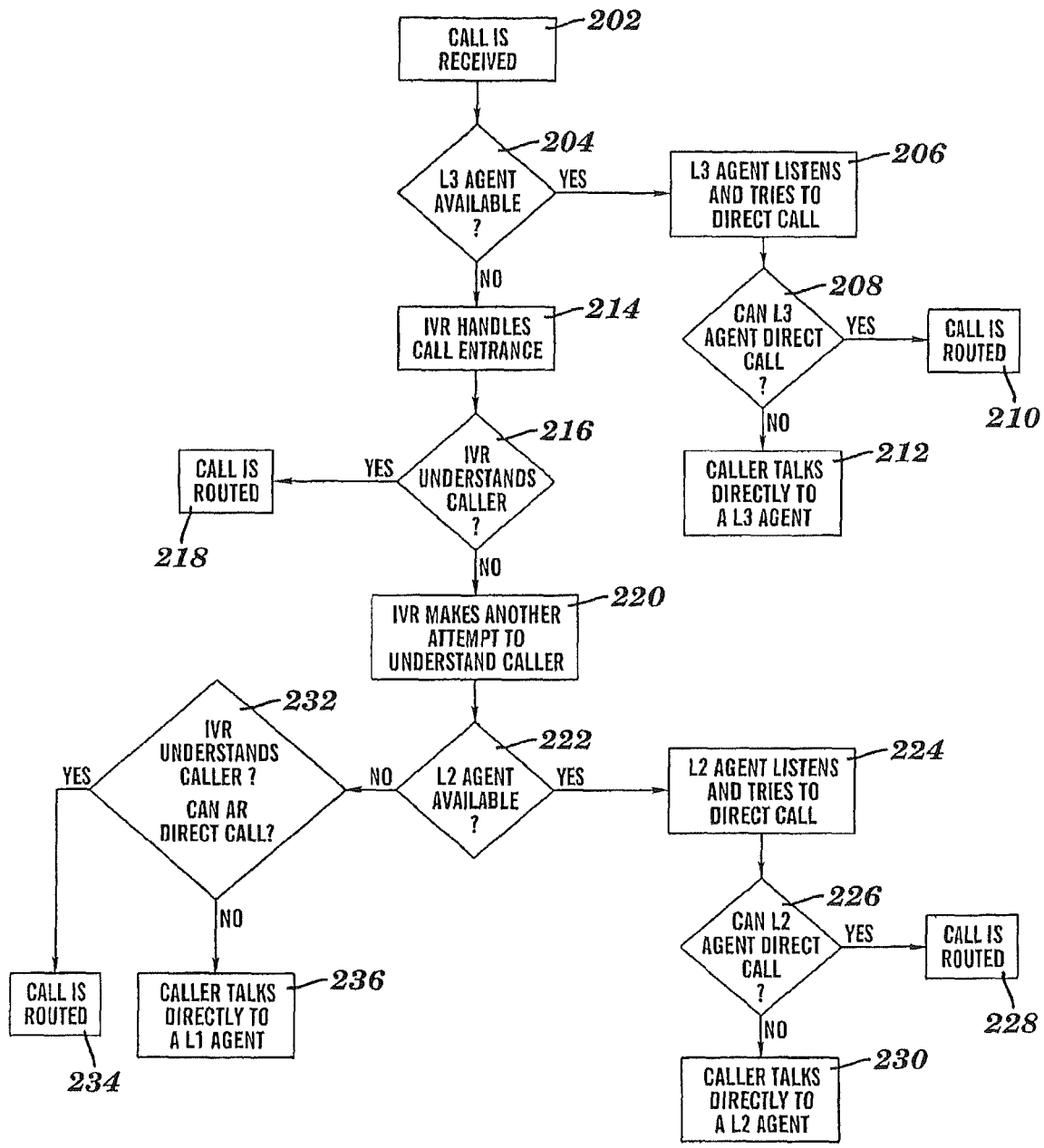
FIG. 2 is a flow diagram of an exemplary process for providing human-assisted natural language call routing.

FIG. 2 is a flow diagram of a process for providing human-assisted natural language call routing using an IVR system 104. In exemplary embodiments, this processing is performed by the call routing software 106. At block 202 a telephone call 202 is received at the IVR system 104. At block 204, the call routing software 106 checks to determine if a level three agent 110 is available. If it is determined, at block 204, that a level three agent 110 is available, then block 206 is performed and the level three agent 206 listens in (behind the scene and without the caller's knowledge) to the interaction (also referred to herein as the initial interaction) between the IVR system 104 and the caller that occurs at block 214. The automated recognizer portion of the IVR system 104 is bypassed and the level three agent 110 attempts to direct the call. If the level three agent 110 can direct the call, as determined at block 208, the call 102 is routed by the IVR system 104 to a routing destination 118 at block 210. If the level three agent 110 does not know how to direct the call 102, as determined at block 208, the call is routed to the level three agent 110 at block 212. At block 212, the level three agent 110 speaks directly to the caller to determine how to route the telephone call 102. The routing information is communicated to the IVR system 104 for routing the telephone call 102 to the specified routing destination 118.

If a level three agent 110 is not available, as determined at block 204, the automated recognizer portion of the IVR system 104 handles the call entrance at block 214. If the IVR system understands the caller, as determined at block 216, then the call is routed at block 218. The call is routed by the IVR system 104 to a routing destination 118 based on instructions from the IVR system 104. If the IVR system 104 does not understand the caller, as determined at block 216, then the IVR system 104 makes another attempt, at block 220 to understand the caller. In parallel to block 220, the call routing software 106 determines, at block 222 if a level two agent 112 is available. If a level two agent 112 is available, as determined at block 222, then the automated recognizer portion of the IVR system 104 is bypassed and a level two agent 112 listens to the interaction (at block 220) between the IVR system 104 and the caller while the caller talks to the IVR system 104 at block 224. In addition, the level two agent 112 may also listen to a recorded copy of the initial interaction between the IVR system 104 and the caller to get more information to be used for directing the telephone call 102.

If the level two agent 112 can direct the call 102, as determined at block 226, the call 102 is routed by the IVR system 104 to a routing destination 118 at block 228. If the level two agent 112 does not know how to direct the call, as determined at block 226, the call 102 is routed to the level two agent 112 at block 230. At block 230, the level two agent 112 speaks directly to the caller to determine how to route the telephone call 102. The routing information is communicated to the IVR for routing the telephone call 102 to the specified routing destination 118.

If a level two agent 112 is not available, as determined at block 222, then block 232 is performed. At block 232, it is determined if the IVR system 104 can understand the caller and direct the telephone call 102. If the IVR system 104 can direct the call 102, as determined at block 232, the call 102 is routed by the IVR system 104 to a routing destination 118 at block 234. If the IVR system 104 does not know how to direct the call 102, as determined at block 232, the call 102 is routed to the level one agent 114 at block 236. At block 236, the level one agent 114 speaks directly to the caller to determine how to route the telephone call 102. The routing information is communicated to the IVR system 104 for routing the telephone call 102 to the specified routing destination 118.

Figure 3:
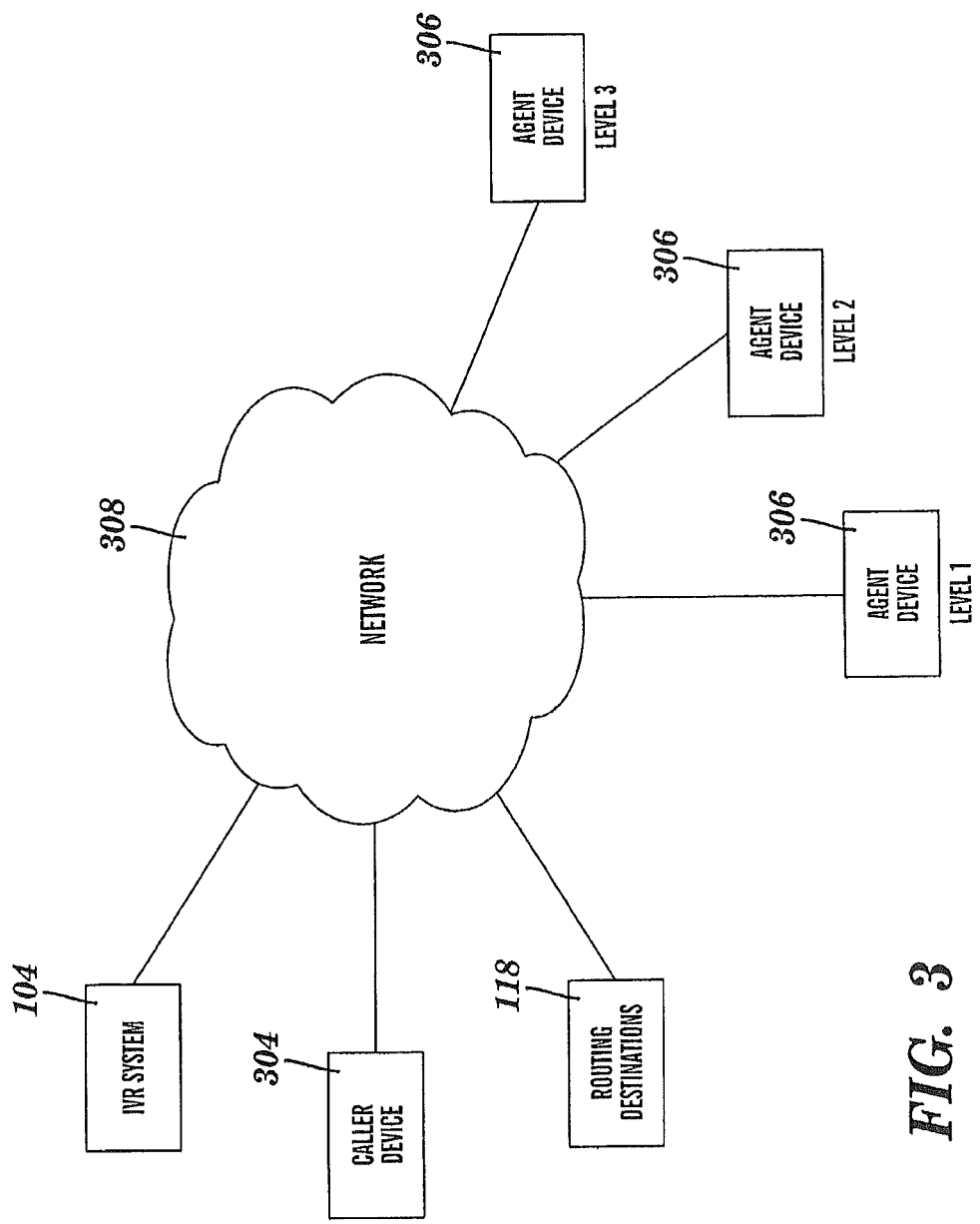
FIG. 3 is a block diagram of an exemplary system that may be utilized to provide human-assisted natural language call routing.

FIG. 3 is a block diagram of a system that may be utilized to provide human-assisted natural language call routing in alternate exemplary embodiments. The system depicted in FIG. 3 is a distributed implementation of an IVR system 104. It includes one or more agent devices 306 through which call center operators at one or more geographic locations may communicate with the IVR system 104 to route telephone calls to routing destinations 118 at one or more geographic locations. In exemplary embodiments, the IVR system 104 executes the call routing software 106 to provide human-assisted natural language call routing. As depicted in FIG. 3, a network 308 (e.g., a LAN, the Internet, a cellular network, and an intranet) is utilized to communicate data and telephone calls between the caller device 304, the routing destinations 118, the agent devices 306 and the IVR system 104. In exemplary embodiments, the network 308 carries both data and voice, and may be implemented as a single network or as multiple networks (e.g., one network for voice and one for data). In this manner, a call center 116 may be physically located in one or more geographic locations. For example, a group of operators may be located in one geographic location with backup operators located in an other geographic location.

Figure 4:
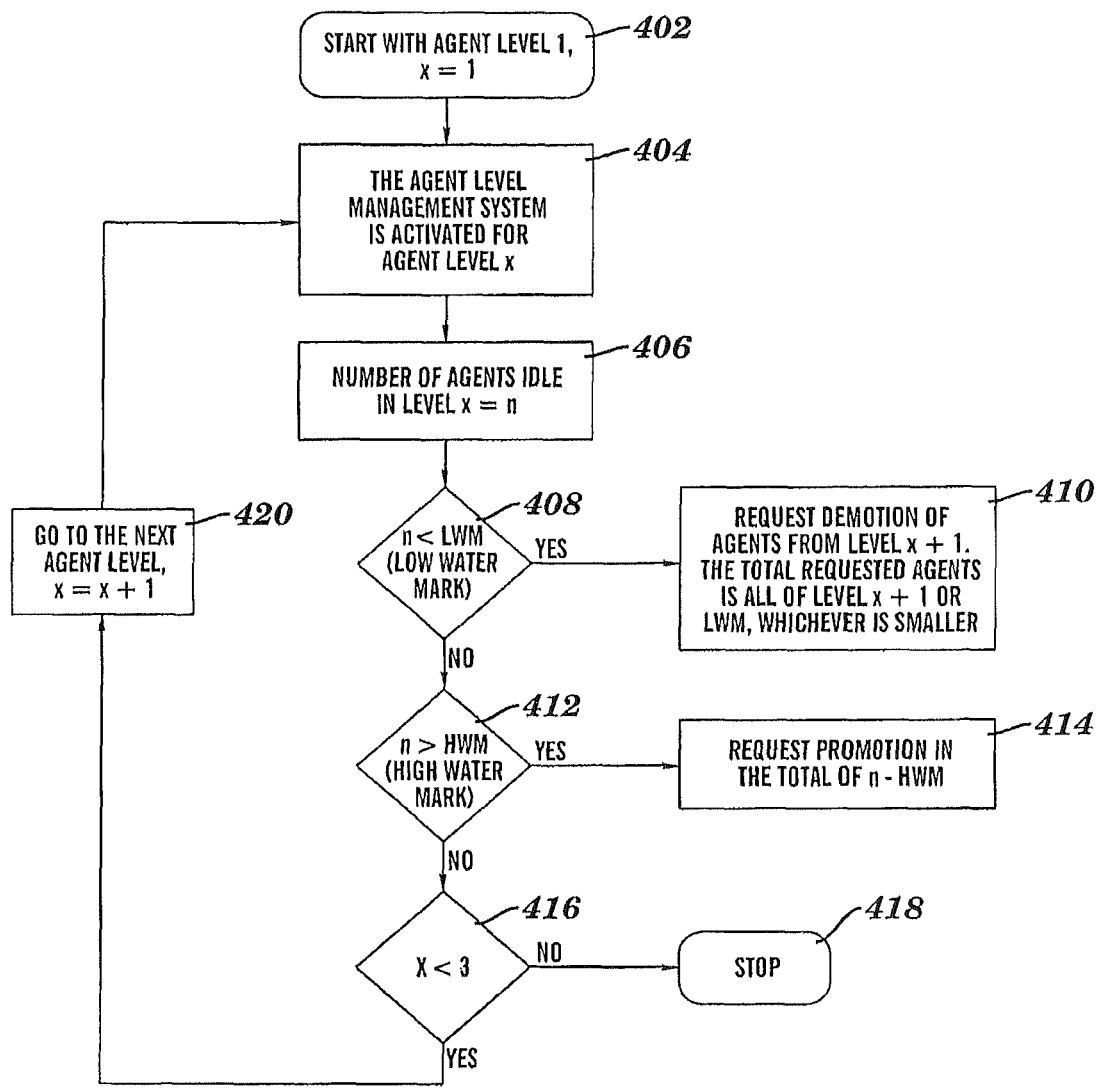
FIG. 4 is a flow diagram of an exemplary process for distributing call center agents among agent pools.

FIG. 4 is a flow diagram of an exemplary process for distributing call center agents among agent pools. In exemplary embodiments, this processing is performed by the call routing software 106. An exemplary embodiment includes three pools of call center operators: a level one agent pool, a level two agent pool and a level three agent pool. Call center operators are distributed among the three pools based on a first threshold of call center operators that are idle in the level one agent pool and a second threshold of call center operators that are idle in the level two agent pool. A level two agent is considered to be available when the level two agent pool includes at least one idle call center operator. Similarly, a level three agent is considered to be available when the level three agent pool includes at least one idle call center operator.

Call center operators may be redistributed among the three pools on a periodic basis, when specified events occur and/or when specified thresholds are met. In addition, the values of the first and second thresholds may be changed on a periodic basis. For example, first thing in the morning all of the call center operators may be located in the level one agent pool and then they may be moved to the level two and level three agent pools(e.g., based on the volume of calls to the call center). In the example process depicted in FIG. 4, the first and second thresholds each include a low water mark (the least number of idle agents desired in the pool) and a high water mark (the most number of idle agents desired in the pool). The processing in FIG. 4 keeps the number of idle operators within the low water mark and the high water mark.

Referring to FIG. 4, processing begins with agent level one (i.e., the level one agent pool) at block 402. At block 404, the agent level management processing is activated for the level one agent pool (i.e., x=1). At block 406, it is determined how many agents are idle in the level one agent pool, this number is referred to as "n." At block 408, it is determined if "n" is less than the low water mark for the level one agent pool. If "n" is less than the low water mark for the level one agent pool, then block 410 is performed to replenish the number of idle agents in the level one agent pool. At block 410, the demotion of level two agents 112 from the level two agent pool is requested. The total requested agents is all of the level two agents 112, or a number of level two agents 112 equal to the low water mark, whichever is smaller.

If "n" is not less than the low water mark for the level one agent pool, as determined at block 408, then block 412 is performed. At block 412 it is determined if "n" is larger than the high water mark for the level one pool. If "n" is larger than the high water mark for the level one pool, then block 414 is performed. Block 414, requests the promotion of level one agents 114 to level two agents 112 in the level two agent pool. The number of level one agents 114 promoted is equal to the difference between "n" and the high water mark for the level one pool. If "n" is not larger than the high water mark for the level one pool, as determined at block 412, then block 416 is performed. At block 416, it is determined if the processing in FIG. 4 has been performed for call center agents in the first and second agent pools. If the processing has been performed for the first and second agent pools, then the processing is stopped at block 418. If not, processing continues at block 420 which specifies that the processing should continue at block 404 for the second agent pool.

In this manner, the processing depicted in FIG. 4 is performed for both the first agent pool and the second agent pool. Call center operators are distributed among the first agent pool, the second agent pool and the third agent pool. The low and high water marks may be the same values or different values for the first agent pool and the second agent pool.

In alternate exemplary embodiments, the call routing software 106 receives updates on how many active agent devices, or call center operators, are idle and which of the idle call center operators are level one agents 114, level two agents 112 and/or level three agents 110. In exemplary embodiments of the present invention, only some call center operators may be trained to operate as level two agents 112 and/or as level three agents 110. In these embodiments, the call routing software 106 keeps track of which call center operators can be routed level two and/or level three agent telephone calls and attempts to maximize the use of the available agents (e.g., by routing all level one agent telephone calls to agents that can only operate as level one agents).

Exemplary embodiments may be utilized to maximize the human agent availability and to improve the performance of the automated call handling systems and automated recognizers (e.g., automated natural language call routing systems) by dividing them into multiple levels. The system may be utilized to generate good speech recognition and understanding rates while improving the re-prompt rate. The worse case scenario happens when no agents are available to be promoted from the first skill level into the second or third skill level. In this case, the system operates as a traditional natural language call routing system. If human agents from the second or third skill level are involved, the system performance may be improved. This may lead to a lower routing misdirect rate and a lower re-prompt rate which may result in increased caller satisfaction.

As described above, embodiments may be in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A system for routing a telephone call, the system comprising:
   a call interface device of an interactive voice response system configured to receive the telephone call from a caller;
   a level one agent processing module including instructions for routing the telephone call to a level one agent for an agent interview of the caller when a level three agent and a level two agent are not available to handle the telephone call, and when the telephone call is not directed by the interactive voice response system after an initial interaction between the caller and the interactive voice response system;
   a level two agent processing module including instructions for handling the telephone call when the level three agent is not available, when the telephone call is not directed by the interactive voice response system after the initial interaction, and when the level two agent is available, the level two agent processing module simultaneously initiating a second interaction between the caller and the interactive voice response system and determining availability of the level two agent;

wherein the level two agent processing module is configured to enable the level two agent to listen to the second interaction between the interactive voice response system and the caller, and the telephone call is routed to the level two agent for direct communication with the caller when the level two agent is unable to route the telephone call after listening to the second interaction; and a level three agent processing module including instructions for facilitating the handling of the telephone call when the level three agent is available, the handling of the telephone call including:

enabling the level three agent to listen to the initial interaction;

routing the telephone call to the level three agent in response to the initial interaction; and directly utilizing caller utterances from the caller during the telephone call to improve speech recognition accuracy of an automated recognizer of the interactive voice response system.

2. The system of claim 1, wherein a response provided to the caller is generated by a human through indirect communication such that the caller perceives the telephone call is conducted between the caller and the interactive voice response system.

3. The system of claim 1, further comprising a level one agent pool, a level two agent pool and a level three agent pool, wherein:

a plurality of call center operator assignments are distributed among the level one agent pool, the level two agent pool, and the level three agent pool based on a first threshold of call center operators that are idle in the level one agent pool and a second threshold of call center operators that are idle in the level two agent pool;

the level two agent is available when the level two agent pool includes an idle call center operator; and the level three agent is available when the level three agent pool includes an idle call center operator.

4. The system of claim 3, wherein the call center operators are re-distributed on a periodic basis among the level one agent pool, the level two agent pool, and the level three agent pool based on the first threshold and the second threshold.

5. The system of claim 3, wherein values of the first threshold and the second threshold vary on a periodic basis.

6. The system of claim 3, wherein the first threshold includes a low water mark and a high water mark, a number of the call center operators from the level one agent pool are promoted to the level two agent pool when a number of idle call center operators in the level one agent pool is more than the high water mark, and a number of the call center operators from the level two agent pool are demoted to the level one agent pool when a number of idle call center operators in the level one agent pool is less than the low water mark.

7. The system of claim 3, wherein the second threshold includes a low water mark and a high water mark, a number of the call center operators from the level two agent pool are promoted to the level three agent pool when a number of idle call center operators in the level two agent pool is more than the high water mark, and a number of the call center operators from the level three agent pool are demoted to the level two agent pool when a number of idle call center operators in the level two agent pool is less than the low water mark.

8. The system of claim 3, wherein a number of the call center operators are located in different geographic locations than the interactive voice response system.

9. The system of claim 3, wherein the interactive voice response system checks availability of the level three agent before routing the telephone call to either of the level two agent and the level three agent.

10. The system of claim 1, wherein the automated recognizer is configured to direct the telephone call, and the level three agent processing module bypasses the automated recognizer.

11. The system of claim 1, wherein the automated recognizer is configured to direct the telephone call, and the level two agent processing module bypasses the automated recognizer.

12. The system of claim 1, wherein the level one agent processing module includes further instructions for routing the telephone call to a routing destination in response to the agent interview.

13. A computer implemented method for routing a telephone call, the method comprising:

receiving the telephone call from a caller at a call interface device on an interactive voice response system;

processing the telephone call at a call routing module in the interactive voice response system, the processing comprising:

performing level one agent processing when a level three agent and a level two agent are not available to handle the telephone call, and when the telephone call is not directed by the interactive voice response system after an initial interaction between the caller and the interactive voice response system, the performing level one agent processing including routing the telephone call to a level one agent for an agent interview of the caller;

performing level two agent processing when the level three agent is not available to handle the telephone call, when the telephone call is not directed by the interactive voice response system after the initial interaction, and when a level two agent is available, the level two agent processing module simultaneously initiating a second interaction between the caller and the interactive voice response system and determining availability of the level two agent;

wherein the level two agent processing module is configured to enable the level two agent to listen to the second interaction between the interactive voice response system and the caller, and the telephone call is routed to the level two agent for direct communication with the caller when the level two agent is unable to route the telephone call after listening to the second interaction; and performing level three agent processing when a level three agent is available, the level three agent processing including facilitating the handling of the telephone, including:

enabling the level three agent to listen to the initial interaction;

routing the telephone call to the level three agent in response to the initial interaction; and directly utilizing caller utterances from the caller during the telephone call to improve speech recognition accuracy of an automated recognizer of the interactive voice response system.

14. The computer implemented method of claim 13, wherein a response provided to the caller is generated by a human through indirect communication such that the caller perceives the telephone call is conducted between the caller and the interactive voice response system.

15. The computer implemented method of claim 13, further comprising distributing an assignment of a plurality of call center operators among a level one agent pool, a level two agent pool, and a level three agent pool based on a first threshold of call center operators that are idle in the level one agent pool and a second threshold of call center operators that are idle in the level two agent pool, wherein the level two agent is available when the level two agent pool includes an idle call center operator, and the level three agent is available when the level three agent pool includes an idle call center operator.

16. The computer implemented method of claim 15, wherein the distributing occurs on a periodic basis among the level one agent pool, the level two agent pool, and the level three agent pool based on the first threshold and the second threshold.

17. The computer implemented method of claim 15, wherein:
the first threshold includes a first low water mark and a first high water mark, a number of the call center operators from the level one agent pool are promoted to the level two agent pool when a number of idle call center operators in the level one agent pool is more than the first high water mark, and a number of the call center operators from the level two agent pool are demoted to the level one agent pool when a number of idle call center operators in the level one agent pool is less than the first low water mark; and
the second threshold includes a second low water mark and a second high water mark, a number of the call center operators from the level two agent pool are promoted to the level three agent pool when a number of idle call center operators in the level two agent pool is more than the second high water mark, and a number of the call center operators from the level three agent pool are demoted to the level two agent pool when a number of idle call center operators in the level two agent pool is less than the second low water mark.

18. The computer implemented method of claim 15, wherein the interactive voice response system checks availability of the level three agent before routing the telephone call to either of the level two agent and the level three agent.

19. A computer program product for routing a telephone call, the computer program product comprising a non-transitory computer readable storage medium readable by a processing circuit and storing instructions for execution by the processing circuit for facilitating a method comprising:
receiving the telephone call from a caller at a call interface device on an interactive voice response system;
performing level one agent processing when a level three agent and a level two agent are not available to handle the telephone call, and when the telephone call is not directed by the interactive voice response system after an initial interaction between the caller and the interactive voice response system, the performing level one agent processing including routing the telephone call to a level one agent for an agent interview of the caller;
performing level two agent processing when the level three agent is not available to handle the telephone call, when the telephone call is not directed by the interactive voice response system after the initial interaction, and when the level two agent is available, the level two agent processing module simultaneously initiating a second interaction between the caller and the interactive voice response system and determining availability of the level two agent;
wherein the level two agent processing module is configured to enable the level two agent to listen to the second interaction between the interactive voice response system and the caller, and the telephone call is routed to the level two agent for direct communication with the caller when the level two agent is unable to route the telephone call after listening to the second interaction; and
performing level three agent processing when a level three agent is available, the level three agent processing including facilitating the handling of the telephone, including:
enabling the level three agent to listen to the initial interaction;
routing the telephone call to the level three agent in response to the initial interaction; and
directly utilizing caller utterances from the caller during the telephone call to improve speech recognition accuracy of an automated recognizer of the interactive voice response system.

20. The computer program product of claim 19, wherein a response provided to the caller is generated by a human through indirect communication such that the caller perceives the telephone call is conducted between the caller and the interactive voice response system.

* * * * *